United States Patent [19]

Asaumi et al.

[11] 4,334,931
[45] Jun. 15, 1982

[54] METHOD FOR PRODUCING ASBESTOS FREE MACHINABLE CALCIUM SILICATE HIGH HEAT-RESISTANT MATERIAL

[75] Inventors: Hiroshi Asaumi, Kamakura; Kazuo Kubota, Yokosuka; Hisanori Yokoo; Mitsuo Yamamoto, both of Yokohama, all of Japan

[73] Assignee: Nippon Asbestos Co., Ltd., Japan

[21] Appl. No.: 244,072

[22] Filed: Mar. 16, 1981

Related U.S. Application Data

[63] Continuation-in-part of Ser. No. 147,545, May 7, 1980, abandoned.

[30] Foreign Application Priority Data

May 15, 1979 [JP] Japan ................................ 54-58689

[51] Int. Cl.³ .............................................. C04B 1/00
[52] U.S. Cl. .................................................. 106/120
[58] Field of Search ........................................ 106/120

[56] References Cited

U.S. PATENT DOCUMENTS 2,748,008 5/1956 Kalousek ............................ 106/120
3,116,158 12/1963 Taylor ................................ 106/120
4,111,712 9/1978 Pusch ................................. 106/120

Primary Examiner—James Poer
Attorney, Agent, or Firm—Wenderoth, Lind & Ponack

[57] ABSTRACT

The asbestos-free calcium silicate heat-resistant material composition, comprises:

(A) 100 parts by weight of a mixture of lime and siliceous material having a $CaO/SiO_2$ mole ratio of 0.6–1.2;

(B) 20–170 parts by weight of xonotlite obtained by hydrothermal synthesis;

(C) 15–150 parts by weight of fibrous wollastonite; and (D) water in an amount of 2–8 times as much as that of the total solid contents and is produced by a method which comprises the steps of:

(i) molding a slurry of a uniform mixture of that recited above in (A) to (D).

(ii) steam curing said molded body in an atmosphere of steam under a pressure of not less than 6 kg/cm² to react the siliceous material with the lime; and (iii) heat treating said steam cured product to remove water therefrom at a temperature of not lower then 100° C. under atmospheric pressure.

5 Claims, No Drawings

METHOD FOR PRODUCING ASBESTOS FREE MACHINABLE CALCIUM SILICATE HIGH HEAT-RESISTANT MATERIAL

CROSS-REFERENCE TO EARLIER APPLICATION

This application is a continuation-in-part of patent application, Ser. No. 147,545 filed May 7, 1980, now abandoned.

BACKGROUND OF THE INVENTION

This invention relates to the material and a method for producing an asbestos free calcium silicate material having high heat-resistance which can be machined into any shape or size required.

Heat-resistant materials comprising calcium silicate and having machinability are well known, and are used for manufacturing items such as conduits, troughs, pouring boxes and the like which are used to transport, hold and supply molten metals such as molten aluminum. These heat-resistant board materials are used as they are or are fabricated into various shapes according to their intended uses. For this purpose, calcium silicate board has various advantageous properties such as low density and low thermal conductivity; not being wetted with molten metals; nor staining or in any manner affecting molten metals.

In addition to these properties, other properties such as high mechanical strength, accurate machinability and durability when in contact with hot molten metals, are required. Therefore, ordinary calcium silicate thermal insulation composed of tobermorite or xonotlite cannot be used, for the above purpose. A typical example of a commercially available material conventionally used has been prepared by a special process comprising molding a body made of amosite asbestos and diatomaceous earth with the addition of an inorganic binder; curing the molded body in an atmosphere of steam under high pressure, and heat treating the cured body.

Not only in the above example, but also in other conventional materials, a large amount of asbestos is present. Asbestos has many outstanding advantages; it provides not only high mechanical strength to the final product, but also provides green strength to the molded body prior to its being cured by steam induration and provides stress distribution during curing and heat treating. However, since it is indicated that asbestos fiber is a hazard to human health, it is preferable not to use it.

Under these circumstances, the development of a heat-resistant material free from asbestos is needed. However, an alternative reinforcing fiber which has satisfactory properties comparable to those of asbestos and which can replace asbestos could not be developed heretofore.

With this background, a material and a method for producing a calcium silicate heat-resistant material free from asbestos has been developed, which can be used for conveying molten metals, and to achieve the present invention.

The conventional asbestos free material has the disadvantages that the material becomes hard, brittle and less machinable if the strength is increased. However, we have found that an asbestos free material having both satisfactory strength and machinability without having the above mentioned disadvantages can be obtained by optimally selecting the combination of ingredients and the firing conditions.

SUMMARY OF THE INVENTION

An object of this invention is to provide a calcium silicate heat-resistant composition, which comprises:

(A) 100 parts by weight of a mixture of lime and siliceous material having a $CaO/SiO_2$ mole ratio of 0.6–1.2;

(B) 20–170, preferably 30–100 parts by weight of xonotlite obtained by hydrothermal synthesis;

(C) 15–150, preferably 50–100 parts by weight of fibrous wollastonite; and (D) water in an amount of 2–8 times as much as that of the total solid contents.

Another object of this invention is to provide a method for producing a calcium silicate heat-resistant material, which comprises the steps of:

(i) molding a slurry of a uniform mixture of:
(A) 100 parts by weight of a mixture of lime and siliceous material having a $CaO/SiO_2$ mole ratio of 0.6–1.2;
(B) 20–170, preferably 30–100, parts by weight of xonotlite obtained by hydrothermal synthesis;
(C) 15–150, preferably 50–100, parts by weight of fibrous wollastonite; and
(D) water in an amount of 2–8 times as much as that of the total solid contents;

(ii) curing said molded body in an atmosphere of steam under a pressure of not less than 6 kg/cm$^2$ to react the siliceous material with the lime; and (iii) heating said cured body to remove water therefrom at a temperature of not lower than 100° C., preferably 330°–1000° C., under atmospheric pressure.

DETAILED DESCRIPTION OF THE INVENTION

The method of this invention is fully described hereinafter.

Siliceous material and lime used as the component (A) in this invention are not specially limited, but any material used for preparing an ordinary calcium silicate type product can be used. Preferable examples of the siliceous material include diatomaceous earth, siliceous sand, ferrosilicon dust, siliceous sinter and the like. Preferable examples of lime include slaked lime, quick lime, carbide residue and the like. These two materials are mixed in such a ratio as to give a $CaO/SiO_2$ mole ratio of 0.6–1.2, preferably 0.7–1.0.

Particle size and degree of purity of the lime and siliceous components will be substantially the same as those of lime and siliceous components used in the past for asbestos reinforced calcium silicate materials.

Hydrothermal synthesis to obtain xonotlite satisfactorily usable as the component (B) in this invention can be carried out, for example, as follows:

Mixing 10 parts by weight of a mixture of lime and siliceous material having a 0.8–1.2 $CaO/SiO_2$ mole ratio with 100–300 parts by weight of water and heating the mixture in an autoclave with a stirrer under a steam pressure of 14–20 kg/cm$^2$ for 2–8 hours.

The siliceous materials may include diatomaceous earth, siliceous sand, siliceous sinter and the like. The lime may be any suitable hydrated lime, quick lime, carbide residue or the like.

The xonotlite thus prepared adsorbs the powdery siliceous material and lime well, thus preventing the loss of these powdery materials in filtered water during the molding step. Asbestos fiber also adsorbs powdery material, but wollastonite fiber does not have this adsorption property. Therefore, the property of xonotlite in the molding step is very important.

Xonotlite also aids in providing "green strength" to the molded body before curing thus improving heat-resistance and strength of the final product. Xonotlite also improves the machinability of the product.

However, the amount of xonotlite should be in the above mentioned range. If the amount of xonotlite is less than the above range, satisfactory effects cannot be obtained. On the other hand, if the amount of xonotlite is larger than the above range, molding requires extraordinarily high pressure and a final product which is obtained by usual molding pressure has an unsatisfactory low density and poor strength.

With regard to fibrous wollastonite, a commercially available product such as "NYARD-G" sold by Interpace Co. in the United States can be used. It is known to use fibrous wollastonite in the production of a calcium silicate heat-resistant material, but it is impossible to replace asbestos by fibrous wollastonite as a reinforcing material, since the fiber of wollastonite is much shorter than asbestos fiber and furthermore the specific surface area of fibrous wollastonite is smaller. The reason for using fibrous wollastonite is not that one can except any reinforcing effect, but to prevent cracking of the molded product during the heat treating step and to improve the machinability of the product.

Wollastonite is a relatively non-reactive material and does not form chemical bonds with autoclave treatment, and therefore the presence of wollastonite in a large amount results in the loss of strength. However, it is preferable to incorporate as much wollastonite as possible to obtain superior machinability and heat-resistance.

Studying these properties of wollastonite, we have found the optimum combination ratio with xonotlite, siliceous material and lime and the optimum firing conditions in order to obtain excellent, well balanced properties.

Another advantage of using fibrous wollastonite is that the heat treating time can be shorter than in the case of asbestos fiber having crystal line water since fibrous wollastonite does not contain crystalline water. But the use of fibrous wollastonite in an excess amount should be avoided since the strength of the final product is lowered.

In this invention, if necessary, a small amount of inorganic fibers such as alkali-resistant glass fiber, rock wool and the like may be used for reinforcement. Also, if desired, organic fibers such as rayon, pulp and the like may be used in order to improve filterability during molding and strength of the molded product before heat treating. The materials for conveying molten metals should not contain combustible materials so organic fiber contained in a molded body must be burned off thoroughly. If the molded body contains a large amount of organic fiber, the strength of the product after heat treating is lowered considerably. According to this invention, the starting materials as mentioned above are uniformly mixed to prepare a slurry, and the slurry is molded to the desired shape, and enough water is expressed from the slurry to leave a shape retaining molded body having a density of 0.5–0.9 g/cm$^2$. Typically such a shape is a flat board. Generally, if the density of the product is higher, the strength also becomes higher. However, if the density is too high, machinability becomes poor and thermal conductivity becomes high.

The steam curing step of the molded body is carried out to react a siliceous material and a lime material and, possibly, to react these materials with the surface of xonotlite particles, thereby producing a matrix comprising calcium silicate. The steam curing is conducted in an autoclave under a vapor pressure of 6–20 kg/cm$^3$ until tobermorite or xonotlite is formed from the silicic acid material and lime material. There is no problem even if a small part of the cured body may form a mixed crystal of calcium silicate hydrate-I(CSH-I) and calcium silicate hydrate-II (CSH-II).

The steam cured product is then dried and heat treated at a temperature of at least 100° C., preferably 330°–1000° C., more preferably 330°–600° C. in airflow.

The heat treating at a temperature of 100°–300° C. removes only absorbed water and the dehydration of crystalline water does not occur in this temperature range. Therefore most remaining crystalline water is removed when in contact with hot molten metals. This is undesirable for certain special uses such as metal supply nozzles of the Hunter Engineering continuous sheet casting machine and the like.

On the other hand, heat treating at a temperature of 600°–1000° C. gives the final product a slightly larger thermal expansion coefficient when reheated. It is unnecessary to heat treat the cured body at temperature higher than the melting point of aluminum (660° C.) which is the highest among those of corresponding metals. Also, the heat treating at an overly high temperature is a waste of energy. However, the heat treating at a temperature of 600°–1000° does not do any damage to the final product. When heat treating at temperatures higher than 1000° C., extreme shrinkage and cracks appear on the product.

Heat treating at temperatures of 330°–600° C. is preferred, since it removes crystalline water in part and it provides the material with low thermal expansion coefficient and therefore reduces the distortion of the material when in contact with hot molten metals. If organic fiber is used, this heat treatment must be carried out at a temperature of at least about 500° C. to burn off the organic fiber.

In this heat treating, the crystalline water of CSH-I and CSH-II is removed (the crystalline water of tobermorite is also removed thoroughly when the heat treating temperature is about 700° C. or higher and that of xonotlite is removed at about 850° C. or higher), and subsequently the microstructure of the matrix changes.

The method for producing a heat-resistant material in accordance with this invention has advantages in that the heat treating can be carried out at a relatively low temperature in a short time as mentioned above; that the product does not warp or crack during the heat treating.

The product prepared in accordance with the method of this invention has all the properties necessary for the material to be used for manufacturing instruments for conveying molten metal as mentioned above, and also, since it does not contain asbestos, it is satisfactory in view of environmental sanitation, particularly during machining.

EXAMPLES

The present invention is further illustrated by the following Examples and Comparative Examples. "Part" in the examples means part by weight. Xonotlite used in the examples was prepared by mixing silica sand and slaked lime (obtained by slaking quicklime with 12 times its amount of hot water) in such a manner as to produce a $CaO/SiO_2$ material with a mole ratio of 0.98, adding 12 times its amount of water to the mixture and reacting the resultant mixture in an atmosphere of steam under a vapor pressure of 16 $kg/cm^2$ for 5 hours while stirring. Wollastonite used in the examples is "NYARD-G" of Interpace Co. in United States

EXAMPLE 1

A mixture of 25 parts xonotlite, 30 parts wollastonite, 23 parts diatomaceous earth, 22 parts slaked lime and 400 parts water was molded into a board of $30 \times 300 \times 300$ mm under a pressure of 15 $kg/cm^2$. The molded body was then subjected to steam curing under a vapor pressure of 9 $kg/cm^2$ for 10 hours. By this treatment, the reaction of diatomaceous earth and slaked lime produced calcium silicate comprising mainly xonotlite. The molded product was then heat treated for 4 hours at various temperatures as listed in the following Table 1. During heat treating, no warpage or cracking appeared on the board, and the appearance of the board remained unchanged.

Various properties of the product are shown in the following Table 1.

EXAMPLE 2

A heat-resistant material was produced by treating a mixture of 15 parts xonotlite, 40 parts wollastonite, 20 parts silica sand, 21 parts slaked lime, 4 parts alkali-resistant glass fiber and 500 parts water in the same manner as in Example 1. During heat treatment there was no warpage or cracking and the appearance of the board remained unchanged.

Various properties of the product are shown in the following Table 2.

EXAMPLE 3

A heat-resistant material was produced by treating a mixture of 20 parts xonotlite, 35 parts wollastonite, 21 parts silica sand, 22 parts slaked lime, 2 parts pulp and 400 parts water in the same manner as in Example 1, except that molding was carried out under a pressure of 10 $kg/cm^2$. During heat treating there was no warpage or cracking, and the appearance of the board remained unchanged.

Various properties of the product are shown in the following Table 3.

EXAMPLE 4

A heat-resistant material was produced by treating a mixture of 56 parts xonotlite, 19 parts wollastonite, 12 parts silica sand, 13 parts slaked lime and 400 parts water in the same manner as in Example 1.

Various properties of the product are shown in the following Table 4.

EXAMPLE 5

A heat-resistant material was produced by treating a mixture of 8 parts xonotlite, 22 parts wollastonite, 33 parts silica sand, 34 parts slaked lime, 3 parts alkali-resistant glass fiber and 500 parts water in the same manner as in Example 1, except that the molding was carried out under a pressure of 5 $kg/cm^2$.

Various properties of the product are shown in the following Table 4.

EXAMPLE 6

A heat-resistant material was produced by treating a mixture of 12 parts xonotlite, 50 parts wollastonite, 19 parts silica sand, 19 parts slaked lime and 500 parts water in the same manner as in Example 1.

Various properties of the product are shown in the following Table 4.

EXAMPLE 7

A heat-resistant material was produced by treating a mixture of 32 parts xonotlite, 6 parts wollastonite, 29 parts silica sand, 30 parts slaked lime, 3 parts alkali-resistant glass fiber and 400 parts water in the same manner as in Example 1, except that the molding was carried out under a pressure of 10 $kg/cm^2$.

Various properties of the product are shown in the following Table 4.

COMPARATIVE EXAMPLE 1

A comparative material was produced by treating a mixture of 35 parts wollastonite, 32 parts diatomaceous earth, 33 parts slaked lime and 300 parts water, except that molding was carried out under a pressure of 5 $kg/cm^2$. During heat treating, warps and cracks did not appear, but as can be seen from the following Table 5, the strength of the product was low and the heat-resistance was poor.

COMPARATIVE EXAMPLE 2

A comparative material was produced by treating a mixture of 20 parts xonotlite, 28 parts silica sand, 38 parts slaked lime, 4 parts alkali-resistant glass fiber and 50 parts water in the same manner as in Example 1. In this case, hair-like cracks appeared on the product.

Various properties of the product are shown in the following Table 5.

These examples are merely recited to show particular embodiments and are not meant to limit this invention in any way, this being left to the claims which follow hereinafter.

TABLE 1

| | | EXAMPLE 1 | | | | | | |
|---|---|---|---|---|---|---|---|---|
| heat treating temperature (for 4 hours) (°C.) | | 100 | 250 | 350 | 450 | 550 | 650 | 750 |
| shrinkage % after heat treating of each temperature for 4 hours | length | | 0.1 | 0.15 | 0.15 | 0.2 | 0.3 | 0.5 |
| | thickness | | 0.4 | 0.6 | 0.8 | 1.0 | 1.2 | 1.6 |
| density (g/cm$^3$) | | 0.62 | 0.62 | 0.61 | 0.61 | 0.58 | 0.60 | 0.58 |
| flexural strength (kg/cm$^2$) | | 80 | 78 | 76 | 75 | 65 | 67 | 55 |
| flexural strength after | | | | | | | | |

TABLE 1-continued

| | | EXAMPLE 1 | | | | | | |
|---|---|---|---|---|---|---|---|---|
| further heating at 850° C. for 3 hours | | 52 | 52 | 50 | 50 | 48 | 48 | 47 |
| shrinkage (%) after heating at 850° C. for 3 hours | length | 0.6 | 0.6 | 0.5 | 0.5 | 0.4 | 0.2 | 0.1 |
| | thickness | 1.8 | 1.7 | 1.5 | 1.4 | 1.3 | 0.8 | 0.3 |
| machinability | | good | good | good | good | good | good | good |

TABLE 2

| | | EXAMPLE 2 | | | | | | |
|---|---|---|---|---|---|---|---|---|
| heat treating temperature (for 4 hours) (°C.) | | 100 | 250 | 350 | 450 | 550 | 650 | 750 |
| shrinkage % after heat treating of each temperature for 4 hours | length | | 0.1 | 0.2 | 0.2 | 0.3 | 0.3 | 0.4 |
| | thickness | | 0.3 | 0.5 | 0.6 | 0.8 | 1.0 | 1.5 |
| density (g/cm$^3$) | | 0.83 | .83 | .82 | .82 | .79 | .81 | .80 |
| flexural strength (kg/cm$^2$) | | 130 | 127 | 120 | 115 | 110 | 102 | 82 |
| flexural strength after further heating at 850° C. for 3 hours | | 80 | 80 | 78 | 77 | 76 | 76 | 75 |
| shrinkage (%) after heating at 850° C. for 3 hours | length | 0.5 | 0.4 | 0.4 | 0.3 | 0.3 | 0.1 | 0.1 |
| | thickness | 1.6 | 1.5 | 1.3 | 1.2 | 1.1 | 0.7 | 0.4 |
| machinability | | fair | fair | fair | fair | fair | fair | fair |

TABLE 3

| | | EXAMPLE 3 | | |
|---|---|---|---|---|
| heat treating temperature (for 4 hours) (°C.) | | 550 | 650 | 750 |
| shrinkage % after heat treating of each temperature for 4 hours | length | 0.1 | 0.3 | 0.4 |
| | thickness | 0.8 | 1.1 | 1.6 |
| density (g/cm$^3$) | | 0.65 | 0.65 | 0.65 |
| flexural strength (kg/cm$^2$) | | 82 | 80 | 70 |
| flexural strength after further heating at 850° C. for 3 hours | | 60 | 60 | 60 |
| shrinkage (%) after heating at 850° C. for 3 hours | length | 0.3 | 0.2 | 0.1 |
| | thickness | 1.2 | 0.5 | 0.2 |
| machinability | | good | good | good |

TABLE 4

| | | EXAMPLE 4 | | EXAMPLE 5 | | EXAMPLE 6 | | EXAMPLE 7 | |
|---|---|---|---|---|---|---|---|---|---|
| heat treating temperature (°C.) (for 4 hours) | | 100 | 350 | 100 | 350 | 100 | 350 | 100 | 350 |
| shrinkage % after heat treating of each temperature for 4 hours | length | | 0.4 | | 0.3 | | 0.1 | | 0.3 |
| | thickness | | 0.6 | | 0.5 | | 0.3 | | 0.5 |
| density (g/cm$^3$) | | 0.42 | 0.39 | 0.86 | 0.81 | 0.81 | 0.78 | 0.58 | 0.53 |
| flexural strength (kg/cm$^2$) | | 36 | 30 | 125 | 98 | 83 | 72 | 76 | 59 |
| flexural strength after further treating at 850° C. for 3 hours | | 21 | 20 | 62 | 59 | 58 | 57 | 35 | 35 |
| shrinkage (%) after heating at 850° C. for 3 hours | | 1.1 | 0.8 | 1.0 | 0.8 | 0.3 | 0.2 | 1.3 | 0.9 |
| | | 2.5 | 2.0 | 2.2 | 1.8 | 1.0 | 0.7 | 2.9 | 2.3 |
| machineability | | good | good | fair | fair | good | good | fair | fair |

TABLE 5

| | | Comparative Example 1 | | Comparative Example 2 | |
|---|---|---|---|---|---|
| heat treating temperature (°C.) (for 4 hours) | | 350 | 550 | 350 | 550 |
| shrinkage % after heat treating | length | 0.6 | 0.8 | 0.4 | 0.5 |
| of each temperature for 4 hours | thickness | 0.9 | 1.4 | 0.6 | 0.8 |
| density (g/cm$^3$) | | 0.64 | 0.62 | 0.83 | 0.81 |
| flexural strength (kg/cm$^2$) | | 50 | 43 | 129 | 115 |
| flexural strength after further heating at 850° C. for 3 hours | | 30 | 28 | 56 | 54 |
| shrinkage (%) after heating at 850° C. for 3 hours | length | 2.5 | 1.9 | 1.6 | 1.4 |
| | thickness | 15.0 | 12.2 | 1.7 | 1.5 |
| machineability | | good | good | poor | poor |

What we claim is:
1. Asbestos-free calcium silicate heat-resistant green material composition, which comprises:

(A) 100 parts by weight of a mixture of lime and siliceous material having a CaO/SiO$_2$ mole ratio of 0.6–1.2;
(B) 20–170 parts by weight of xonotlite obtained by hydrothermal synthesis;
(C) 15–150 parts by weight of fibrous wollastonite; and (D) water in an amount of 2-8 times as much as that of the total solid contents.

2. The composition as in claim 1, wherein the amount of xonotlite is 30-100 parts by weight and the amount of fibrous wollastonite is 50-100 parts by weight.

3. A method for producing an asbestos-free calcium silicate type heat-resistant material, including the steps of:
(i) molding a slurry of a uniform mixture of:
(A) 100 parts by weight of a mixture of lime and siliceous material having a $CaO/SiO_2$ mole ratio of 0.6-1.2;
(B) 20-170 parts by weight of xonotlite obtained by hydrothermal synthesis;
(C) 15-150 parts by weight of fibrous wollastonite; and
(D) water in an amount of 2-8 times as much as that of the total solid contents.
(ii) steam curing said molded body in an atmosphere of steam under a pressure of not less than 6 kg/cm$^2$ to react the siliceous material with the lime; and
(iii) heat treating said steam-cured product to remove water therefrom at a temperature of not lower than 100° C. under atmospheric pressure.

4. The method according to claim 3, wherein the heat treating of step (iii) is carried out at a temperature of 330°-1000° C. under atmospheric pressure.

5. A molded, steam-cured and heat-treated material consisting essentially of the product of claim 3.

* * * * *